US011210663B2

(12) United States Patent
Voorhees

(10) Patent No.: US 11,210,663 B2
(45) Date of Patent: Dec. 28, 2021

(54) DIGITAL ASSET ZERO-CUSTODY SWITCH

(71) Applicant: Shapeshift AG, Denver, CO (US)

(72) Inventor: Erik Voorhees, Dillion, CO (US)

(73) Assignee: SHAPESHIFT AG, Sarnen (CH)

( * ) Notice: Subject to any disclaimer, the term of this patent is extended or adjusted under 35 U.S.C. 154(b) by 691 days.

(21) Appl. No.: 15/365,783

(22) Filed: Nov. 30, 2016

(65) Prior Publication Data

US 2017/0154331 A1 Jun. 1, 2017

Related U.S. Application Data

(60) Provisional application No. 62/261,011, filed on Nov. 30, 2015.

(51) Int. Cl.
*G06Q 20/38* (2012.01)
*H04L 29/08* (2006.01)
(Continued)

(52) U.S. Cl.
CPC ....... *G06Q 20/3829* (2013.01); *G06Q 20/223* (2013.01); *H04L 9/085* (2013.01);
(Continued)

(58) Field of Classification Search
CPC ........... G06Q 20/0658; G06Q 20/3829; G06Q 20/223; H04L 9/085; H04L 9/0894;
(Continued)

(56) References Cited

U.S. PATENT DOCUMENTS

2015/0206106 A1* 7/2015 Yago
2015/0220928 A1* 8/2015 Allen et al.
(Continued)

OTHER PUBLICATIONS https://bitfury.com/content/downloads/contracts-1.1.1.pdf (Year: 2015).*
(Continued)

*Primary Examiner* — James D Nigh
*Assistant Examiner* — Yin Y Choi
(74) *Attorney, Agent, or Firm* — Sanderson IP Law, Ltd.

(57) ABSTRACT

The embodiments described herein comprise hardware and software improvements in blockchain-asset exchange technology, whereby one or more servers automatically, based on a set of predetermined rules, executes a mechanism allowing blockchain-asset exchange customers to place standing-limit or market orders for blockchain-based digital assets (e.g., cryptocurrencies) with a counter-party, but without counter-party risk. The counter-party will not receive the payment until the customer's exchange order has executed, and the customer has taken possession and ownership of the desired asset. The customer cannot reverse payment or otherwise rescind the payment from the counter-party once the customer receives the desired asset. The systems and methods use blockchain databases, multisignature key signing procedures, and a transparent, objective, automated, rules-based software agent t manage and autonomously govern transfer of digital blockchain-based assets in a multi-party exchange scenario, without risk of asset loss and without the discretion of any human actor.

12 Claims, 7 Drawing Sheets

(51) Int. Cl.
  *H04L 29/06* (2006.01)
  *H04L 9/32* (2006.01)
  *H04L 9/08* (2006.01)
  *G06Q 20/22* (2012.01)

(52) U.S. Cl.
  CPC .......... *H04L 9/0894* (2013.01); *H04L 9/3247* (2013.01); *H04L 9/3255* (2013.01); *H04L 63/04* (2013.01); *H04L 63/06* (2013.01); *H04L 67/20* (2013.01); *H04L 67/42* (2013.01); *G06Q 2220/00* (2013.01); *H04L 2209/56* (2013.01)

(58) Field of Classification Search
  CPC ..... H04L 9/3247; H04L 9/3255; H04L 63/04; H04L 63/06; H04L 67/20; H04L 67/42
  USPC .......................................................... 705/71
  See application file for complete search history.

(56) References Cited

U.S. PATENT DOCUMENTS

| | | |
|---|---|---|
| 2015/0262139 A1* | 9/2015 | Shtylman |
| 2015/0287026 A1 | 10/2015 | Yang et al. |
| 2015/0324789 A1* | 11/2015 | Dvorak et al. |
| 2016/0162897 A1 | 6/2016 | Feeney |
| 2016/0164884 A1* | 6/2016 | Sriram et al. |
| 2016/0261999 A1 | 9/2016 | Harper |
| 2016/0283941 A1* | 9/2016 | Andrade |
| 2016/0342977 A1* | 11/2016 | Lam |
| 2016/0342989 A1* | 11/2016 | Davis |
| 2017/0008391 A1* | 1/2017 | Criel et al. |
| 2017/0017958 A1* | 1/2017 | Scott et al. |
| 2017/0048216 A1* | 2/2017 | Chow et al. |
| 2017/0078493 A1* | 3/2017 | Melika et al. |
| 2017/0085545 A1* | 3/2017 | Lohe et al. |

OTHER PUBLICATIONS

International Search Report and Written Opinion of the International Searching Authority, dated Feb. 7, 2017 in International Application No. PCT/US2016/064056, 13 pages.
Nakamoto, Satoshi, "Bitcoin: A Peer-to-Peer Electronic Cash System," 2009.
Buterin, Vitalik, "Ethereum: The Ultimate Smart Contract and Decentralized Application Platform," 2013.
Wood, Gavin, "Ethereum: A Secure Decentralized Generalised Transaction Ledger," 2014.

* cited by examiner

DIGITAL ASSET ZERO-CUSTODY SWITCH

CROSS-REFERENCE TO RELATED APPLICATIONS

This application is a non-provisional application claiming the benefit of U.S. Provisional Application No. 62/261,011, entitled "Systems and Methods for Improving Security in Blockchain-Asset Exchange," filed Nov. 30, 2015, which is incorporated by reference in its entirety herein.

TECHNICAL FIELD

The present disclosure relates to improving and enhancing blockchain-asset exchange security by employing automatic rules and automatic multi-party confirmation.

BACKGROUND

Blockchain-assets are digital tokens (e.g., Bitcoin) that use computer cryptography to secure transactions and to control the creation of new units. Crypto-currencies are a subset of blockchain-assets (also known as "altcoins," "digital currencies," and "virtual currencies"). Bitcoin was the first popular example of a blockchain-asset and became the first decentralized crypto-currency in 2009. Numerous blockchain-assets currently exist, which include crypto-currencies, digital ownership or asset tokens, tokenized shares and securities, etc. The defining characteristic is a distributed ledger system, known as a blockchain.

Blockchain-assets are traded on exchanges around the world. Traditional non-blockchain-asset exchanges provide efficient order matching automation, but suffer from custodianship risk. They hold a customer's funds in an account to facilitate a transaction. All modern exchanges, from NASDAQ to FOREX markets to traditional Bitcoin exchanges, hold customer funds in order to establish an order book for exchange trading. The customer must therefore trust that the exchange will safeguard their money.

With non-blockchain-asset exchanges (like the traditional NASDAQ or NYSE), all assets are contract or paper based, stored in a central database. They are not blockchain based (stored in a decentralized database or locally stored ledgers). Because of this, their transfer and exchange can almost always be reversed. So, if the NASDAQ system was ever hacked or attacked, resulting in changes to balances of customers or the bad actor absconding with funds, NASDAQ (along with banks) can rollback the last instructions and customers will retain their money. As a result, traditional non-blockchain exchanges have earned and kept customer's trust, and the risk is manageable.

Blockchain-based digital assets, such as Bitcoin, rely on a distributed database of peer-to-peer networking to maintain a continuously growing list of data records that are hardened against tampering and revision. These records are often enforced cryptographically and hosted on machines working as data storage nodes. Blockchain-asset exchanges use decentralized control as opposed to centralized electronic money/centralized banking systems.

With crypto-currency or blockchain-based assets there is often no "reversion" possible with the instructions. If a bad actor breaks into an exchange and revises customer balances or steals funds, those instructions cannot be reversed. Funds can be stolen by outsiders (or insiders) with no recourse. This problem was seen many times since the creation of Bitcoin, with the collapse of the Japan-based Mt. Gox Bitcoin exchange being the most notorious. Over $400 m of customer money vanished in 2014 when Mt. Gox collapsed. The money "vanished" because Mt. Gox had custody of customer's money.

There is thus a need, for a blockchain-asset exchange in which there is Zero custody of the funds by the exchange itself. What is needed is a system and method for offering a blockchain-asset exchange that provides parties and counter-parties with security in Swapping possession of their blockchain-assets without counter-party risk. A customer needs assurance that a counter-party will not receive the customer's payment until the desired asset is received by the customer (from the counter-party); conversely, a counter-party needs assurance that once an order is fulfilled, the payment funds are irreversible by the customer. As such, what is needed is a mechanism capable of confirming that parties (e.g., customer, counter-party) to an exchange or transaction receive their expected payment or property before the system releases the counter-payment or counter-property. In this way, a rule based, computer implemented "Zero-Custody Switch" is described that improves computer security by ensuring funds are in place and requires automated multisignature authorization before taking action, such that, neither party has to trust the other.

SUMMARY

Disclosed herein are systems and methods capable of addressing the above-described shortcomings in the art, and may also provide any number of additional or alternative benefits and advantages. The embodiments described herein may comprise hardware and software components capable of hosting a blockchain-asset exchange, whereby one or more servers execute a software-based mechanism allowing exchange customers to place standing-limit orders for blockchain-based digital assets (e.g., crypto-currency, Bitcoin, etc.) with a counter-party. The present system describes a mechanism (the "Zero-Custody Switch") by which crypto-currency and blockchain-based assets can be placed in "bid" and "ask" orders and exchanged with no custodianship. A customer can place market or limit-orders in this exchange, and have them execute or be fully-refunded at the customer's request, with zero risk to the customer or the exchange.

In an embodiment, the transaction is non-custodial for both parties; it is cryptographically secured on a blockchain such that neither party alone can transfer payment, and the order is configured to expire after a user-defined period of time. The customer may be assured that the counter-party will not receive payment until the customer receives the desired asset. This assurance is based in part on a third party rule-based "Oracle" that can independently confirm transactions based on updates to the public blockchain database. Likewise, the counter-party may be assured that once the order is fulfilled, and the customer receives the desired asset, the customer cannot reverse payment or otherwise rescind the payment from the counter-party.

In an embodiment, a computer-implemented method comprises generating, by an exchange server hosting a digital asset exchange service, an encrypted multi-signature payment account, wherein the payment account is encrypted according to a first key generated by a client computer, a second key generated by the exchange server, and a third key generated by an oracle server, and wherein the payment account is accessible when decrypted by at least two keys of the first key, the second key, and the third key; monitoring, by the exchange server, a first public blockchain asset record, a transfer of a first digital asset from the client computer to the encrypted multi-signature payment account;

monitoring, by the exchange server, a second public blockchain asset record, a transfer of a second digital asset from a second client computer, to an account associated with the client computer; and upon verifying, by the exchange server, via the second public blockchain asset record, a transfer of the second digital asset to an account associated with the client computer: signing, by the exchange server, the first blockchain of the first digital asset, wherein the oracle server signs the first blockchain using the third key.

In another embodiment, a computing system for exchanging blockchain-based digital assets, the system comprises an exchange server hosted on one or more server computers comprising a processor, the exchange server configured to: generate an encrypted multi-signature payment account, wherein the payment account is encrypted according to a first key generated by a client computer, a second key generated by the exchange server, and a third key generated by an oracle server, and wherein the payment account is accessible when decrypted by at least two keys of the first key, the second key, and the third key; monitor a first public blockchain asset record, a transfer of a first digital asset from the client computer to the encrypted multi-signature payment account; monitor a second public blockchain asset record, a transfer of a second digital asset from a second client computer, to an account having a payment address associated with the client computer; and upon verifying, via the second public blockchain asset record, a transfer of the second digital asset to an account associated with the client computer: sign the first blockchain of the first digital asset, wherein the oracle server signs the first blockchain using the third key.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
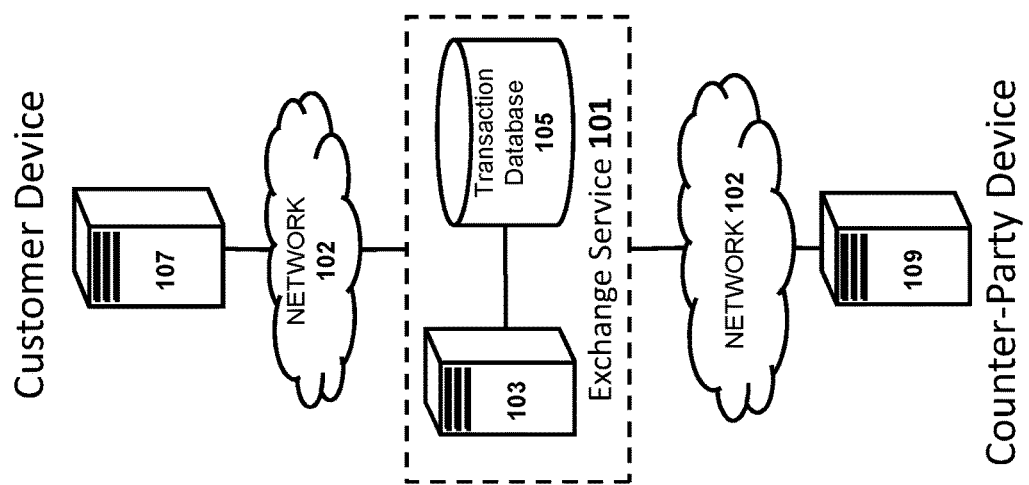
FIG. 1 shows components of an embodiment in accordance with the present disclosure.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

In an embodiment, the term Zero-Custody Switch refers to a system or mechanism that enables the implementation of non-custodial limit or market orders, in full or in part, (and therefore a functional financial exchange order book) for blockchain-based assets. A non-custodial order is one in which no one party takes possession of the other party's assets (they are instead held in a distributed blockchain-based, decentralized multisignature account), thereby removing the potential counter-party exposure of the underlying asset until the transaction is verified and completed.

Typically, a User wishes to purchases or exchange one blockchain-based asset for another. For example, UserA possess CoinA (i.e. Bitcoin) that he/she wishes to sell to purchase CoinB (i.e. Ethereum) at a price of 1:10. An Exchange company may possess CoinB that it is willing to sell. As used herein the term Exchange refers to a blockchain asset merchant or a blockchain asset exchange. UserA therefore wants to place an order to be executed when the price of CoinB drops to 0.1 of CoinA. UserA always wants to ensure that if the price goal is not achieved, then the order will not execute and will be retractable or cancelable. UserA can also place a duration or expiration time on the order which will expire at a given point and trigger a refund back to UserA.

In an embodiment, UserA creates a non-custodial order with the Exchange and then sends funds to an m-of-n multi-signature address identified by the Exchange. In an embodiment, a 2 of 3 multi-signature address is used, although any other level of multi-signature address could be used. In operation, an automated, policy-based, third-party Oracle—which may be a multi-signature cosigner independent of or operated by the Exchange—signs along with either UserA or the Exchange depending on certain rules and the circumstance. In an embodiment, the third party Oracle can be another company or can be a software application residing on a server (including a decentralized server, or as a "digital autonomous corporation" (DAO)). The Oracle does not need to be owned or managed once established. It is essentially a switch that, based on a set of predetermined rules, determines whether the funds will go to the Exchange or to the User. The basic rules of this switch are as follows: If the desired funds have been sent to the User (as defined by the public blockchain) then sign with the Exchange to complete the transaction. The use of the 2-of-3 multisig account ensures that no one party can act unilaterally for any transaction. To complete any transaction, 2 of the 3 parties must agree to sign. The Exchange cannot receive the User's funds until it has proven it has sent the desired asset, and the User cannot claw back his funds if the Exchange has already proven transfer of the desired asset. The Oracle signs with one party or the other based on irrefutable blockchain data.

Once a User has specified an order, the Exchange will give them a multisignature blockchain-asset address. As is understood in the art, a multisignature address requires several private keys to be used to access the account and transfer assets. This is different from a normal blockchain-asset transaction which requires just one signature. In a normal blockchain-asset transaction, if a User has a private key they can spend the money. Traditional blockchain-asset exchanges hold the private keys for User's accounts, and this is why they have custodianship and thus counter-party risk.

Once two signatures are received (in a 2-of-3 multisig scenario), the asset may be transferred. In an embodiment, if the Oracle and the seller (Exchange) sign, the asset goes to the Exchange. If the Oracle and the User sign, the User's funds go back to the User. In the case of a partial fulfillment of an order, Oracle may only sign for a proportionate amount of the asset to be transferred to Exchange, and would sign the remainder amount back to the User if requested. Once the transfer of the desired blockchain-based digital asset occurs, either the Exchange or the Oracle broadcasts this transaction to every node on the blockchain network that then records that same transaction all around the world. In this manner, like in all blockchain-asset transactions, there is no central server. All block based reporting is done on a public peer-to-peer network.

In an embodiment, the following rules may be used to determine the required signatures. If UserA received CoinB at the Final_Address (in full or in part), the Oracle signs with the Exchange, who receives CoinA (in full or in part); if UserA has not received CoinB at the Final_Address, she may cancel the order, or it may expire. In either case, the Oracle multi-signature cosigner signs with UserA, such that she receives her CoinA back to her designated Refund_Address (the full amount if none of the order was fulfilled, and a partial amount if part of the order was fulfilled).

As used herein there are four addresses of note when embodiments of the system are in operation: Payment_Address, Final_Address, Merchant_Address, and Refund_Address. But one having skill in the art would appreciate that in various embodiments any number of addresses may be included or used for the purposes of identifying payees, payors, and parties responsible for cryptocurrency exchange.

A Funded Order is a non-custodial order that has received CoinA from UserA. An Unfunded Order is a non-custodial order that has not yet received CoinA from UserA and a Completed Order is a non-custodial order in which CoinB has been sent to UserA at Final Address, completing the transaction.

Payment_Address refers to the address to which UserA must send CoinA to create a Funded Order. Final_Address is the address to which UserA's wants the CoinB sent if and when the order completes. A Refund_Address is the address to which UserA wants a refund of CoinA sent if order does not complete, i.e., if the order expires. Additionally, there is the Merchant_Address which is the address where the Exchange wants CoinA sent if order completes.

In an embodiment, it is impossible for one party to defraud or take another party's funds. To send or to move the funds out of the multisig account requires at least two signatures (one each from two parties). If there are not two signatures the funds can not be moved out. So there is no one party in the equation who can gain access without the approval of another. If the Exchange wishes to take the User's money without authority, it would have to convince the rule based Oracle or the User to offer their signatures, which the Exchange cannot compel them to do.

In an embodiment, the following is sent to the Oracle at order creation: Final_Address (User's address that CoinB must be sent to on completion of order); Expected Amount (amount that must be sent to Final_Address on completion of order); Merchant_Address (Merchant_Address or Exchange_Address to which it receives CoinA on completion of order); Refund Address (User's address to which it receives CoinA if order does NOT complete); and Expiration Time (UTC Date/time after which order is ended and CoinA is returned to Refund Address). In an embodiment, the return delta (i.e., the amount of time the Oracle waits after User requests a refund to make sure order has not cleared) may also be sent as a variable or may be set to a specific period in the Oracle.

In an embodiment, the offered price for CoinB matches the price the User wants. In this case, Exchange will send CoinB funds to the User's Final_Address. Exchange then requests Oracle to co-sign the CoinA funds over to the Merchant_Address. Oracle checks Final_Address and if funds in the Expected Amount are present, the Oracle will sign with the Exchange for CoinA funds to go to the Merchant_Address (in full or in part, based on how much of the order was filled).

In an embodiment, if a User wishes to cancel an order, the User may send a request to the Oracle to cancel order. The Oracle waits a predetermined time (the return delta) and then checks to confirm that the Final_Address has not received any deposited funds in the Expected_Amount before signing with the User for CoinA to go to Return_Address, specified at creation time.

In an embodiment, where a User wishes to cancel an order, the User may contact the Exchange to cancel the order. In this embodiment, the User confirms cancellation with the Exchange instead of the Oracle and the Exchange cosigns the return (most likely manually). This is done if, for example, the Oracle is offline or otherwise missing. In this manner, the User can always get their asset back if the order has not been fulfilled or if the Oracle disappears.

In an embodiment, where the order expires, because the duration is reached without the order being filled, a full refund will occur automatically, without the Exchange or User requesting it. Upon expiration, the transaction will be signed by the Oracle to return CoinA to Return_Address. In order for this to occur, the Return transaction is given to the Oracle at creation time, and signed by the User's key. This may be done automatically by Oracle, or even without Oracle using a protocol such as "checklocktimeverify" built into the blockchain (see FIG. 7).

In an embodiment, if the Exchange ceases to exist before the order is fulfilled, the Oracle can either wait for the expiration times to occur normally or may automatically sign the return transaction (since it possesses a Return transaction already co-signed by UserA). In this embodiment, CoinA will be sent to Refund_Address.

In an embodiment the User will be refunded even if the Oracle ceases to exist. Since there is nobody besides the Oracle to cosign with the Exchange if a limit order is completed, the Exchange may cancel all limit orders and sign returns of CoinA respectively to Users once it determines that the Oracle is not longer valid.

In an embodiment, if the User's key gets stolen the User will not lose funds. A stolen key can only be used to request a return of CoinA to Refund_Address (because the Oracle will only co-sign to that address). This removes the risk from the User even if her key is stolen, and limits the liability of the Exchange and Oracle.

In an embodiment, if the Exchange's key gets stolen the Exchange will not lose funds. Since the Merchant_Address is set at creation time, this case is the same as the User key getting stolen. The party who stole the key is only able to send CoinA to the Exchange since that is the only address to which the Oracle will cosign. Thus there is no risk to Exchange even if its key is stolen.

In an embodiment, if the Exchange' system is compromised the customer device, Oracle, or other computer in the system may request all User orders to be refunded to Refund_Address. Unlike conventional exchanges, when such cases in the exemplary system, the User's assets are not in danger, because the Oracle, which is not compromised, will only send funds to User's Refund_Address.

In an embodiment, if the Oracle is compromised the funds will be safe. If the Oracle is compromised, it could sign transactions to malicious addresses. But this is not possible because the Oracle would require either the User or Exchange to co-sign in order to shift ownership of the cryptocurrency; thereby requiring two of three entities to be compromised before funds can be lost. In an embodiment, if User or Exchange believes Oracle to be compromised, either can enact refund of User's funds to Refund_Address unilaterally (because each already has a partially signed refund transaction).

In an embodiment, the following information is returned from the Oracle upon creation: deposit address (i.e., the multisig address to which User sends CoinA to activate order); TX complete (an unsigned transaction to Merchant_Address to be signed by Oracle to complete a transaction); and TX return_a (a transaction to Refund_Address presigned by the User's key and Oracle's key, given to Exchange). In an embodiment, TX return_b (a transaction to Refund_Address signed by User's key and Exchange's key) may also be sent to the Oracle upon account creation.

In an embodiment, the sole determination of whether to transfer funds to a new owner lies with the Oracle (which follows prescribed rules). This is because the Exchange will always sign a transaction to itself because it wants the User's money and the User will always sign a transaction back to herself because she wants the new asset. Accordingly, the power lies with the Oracle to cause the asset switch to occur, and the Oracle may have only specific rules built into its code. It monitors the publicly available blockchain and it detects when and if a User's account received its currency. If it can verify the transfer it takes a first action. If it can not verify a transaction it may take a second action. It will not act until it can verify from the updates to the public block chains that the funds have been deposited. The Oracle acts automatically based on public information without User or Exchange input, making a transaction between two self-interested parties programmatically fair, safe, and honest. If a sufficient, objective, publicly verifiable condition has been met, CoinA will go to Exchange, in proportion to the extent to which it was fulfilled. If the condition is not met, CoinA will always go back to User, in proportion to the extent to which it was unfulfilled.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof. Further, alternate terminology should not be limited necessarily as exclusionary, but can be inclusionary as well.

Unless otherwise defined, all terms used herein, including technical and scientific terms, have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to an up to and including a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader meaning of terms, the present disclosure controls. If such disclosures conflict in part and/or in whole with one another, then to the extent of conflict, the later-dated disclosure controls.

FIG. 1 shows components of an exemplary system 100, according to an exemplary embodiment. Exchange service 101 comprising one or more Exchange servers 103 and one or more transaction databases 105. An Exchange server 103 can be any general or special purpose computer. It may operate as a single computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of the Exchange. The computer can be touchscreen and/or non-touchscreen. The computer can include and/or be part of another computer system and/or cloud network. The computer can run any type of OS, such as iOS™, Windows™, Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with networks 102, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can be equipped with NFC circuitry. The computer can run a database, such as a relational database, which contains User and account information.

A transaction database 105 can be a separate database or incorporated into a computer or computers hosting the exchange server 103. It may be a relational database, a flat file, a segmented database, or any other form or structure. Database 105 may be maintained by Exchange service 101 or may be maintained by a third party. A customer device 107 can be a mobile device, a tablet, a computer, a laptop, a portable computing device, a stationary computing device, a data entry terminal or a dumb terminal. It may be a wired or wireless device and may be a standalone device or may be coupled to a network.

A third-party computer 109 may be a computer or server, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of the Oracle. The computer can be touchscreen and/or non-touchscreen. The computer can include and/or be part of another computer system and/or cloud network. The computer can run any type of OS, such as iOS™, Windows™, Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 102, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can run an Oracle application.

One or more networks 102 may include a plurality of nodes, such as a collection of computers and/or other hardware interconnected by communication channels, which allow for sharing of resources and/or information. Such interconnection can be direct and/or indirect. Network 102 can be wired and/or wireless. Network 102 can allow for communication over short and/or long distances. Network 102 can operate via at least one network protocol, such as Ethernet, a Transmission Control Protocol (TCP)/Internet Protocol (IP), and so forth. Network 102 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 102 can be and/or include an intranet and/or an extranet. Network 102 can be and/or include Internet. Network 102 can include other networks and/or allow for communication with other networks, whether sub-networks and/or distinct networks, whether identical and/or different from network 102. Network 102 can include hardware, such as a network interface card, a repeater, a hub, a bridge, a switch and/or a firewall. Network 102 can be operated, directly and/or indirectly, by and/or on behalf of one and/or more entities.

Figure 2:
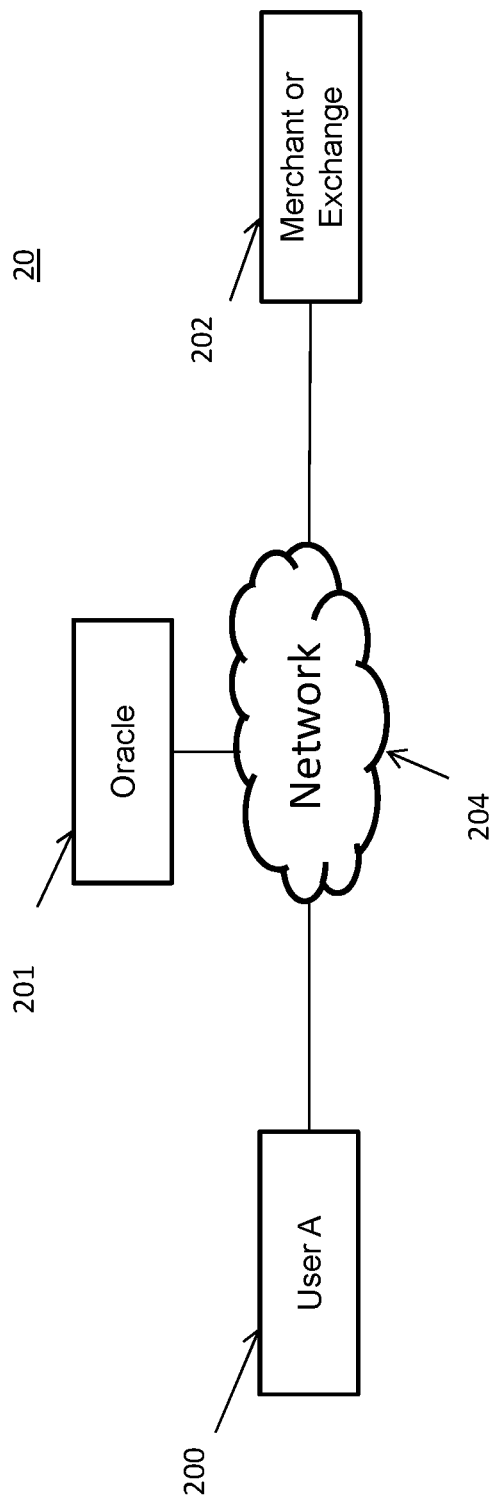
FIG. 2 depicts the components of an embodiment of a network in accordance with the present disclosure.

FIG. 2 shows an example embodiment of a network environment according to the present disclosure. An environment for an exemplary system 20 includes a network 204, a UserA 200, Oracle 201, and an Exchange 202.

Network 204 includes a plurality of nodes, such as a collection of computers and/or other hardware interconnected by communication channels, which allow for sharing of resources and/or information. Such interconnection can be direct and/or indirect. Network 204 can be wired and/or wireless. Network 204 can allow for communication over short and/or long distances. Network 204 can operate via at least one network protocol, such as Ethernet, a Transmission Control Protocol (TCP)/Internet Protocol (IP), and so forth. Network 204 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 204 can be and/or include an intranet and/or an extranet. Network 204 can be and/or include Internet. Network 204 can include other networks and/or allow for communication with other networks, whether sub-networks and/or distinct networks, whether identical and/or different from network 204. Network 204 can include hardware, such as a network interface card, a repeater, a hub, a bridge, a switch and/or a firewall. Network 204 can be operated, directly and/or indirectly, by and/or on behalf of one and/or more entities, irrespective of any relation to UserA 200, Oracle 201, and/or Exchange 202.

UserA 200 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of UserA 200. The computer can be touchscreen and/or non-touchscreen. The computer can include and/or be part of another computer system and/or cloud network. The computer can run any type of operating system (OS), such as iOS™, Windows™, Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 204, such as directly and/or indirectly. Such communication can be via a software application, a mobile app, a browser, an OS, and/or any combination thereof. The computer can include circuitry for global positioning determination, such as via a global positioning system (GPS), a signal triangulation system, and so forth. The computer can be equipped with near-field-communication (NFC) circuitry.

Oracle 201 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of Oracle 201. The computer can be touchscreen and/or non-touchscreen. The computer can include and/or be part of another computer system and/or cloud network. The computer can run any type of OS, such as iOS™, Windows™, Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 204, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can be equipped with NFC circuitry. The computer can run a database, such as a relational database, which contains User and/or account information.

Exchange 202 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of Oracle 201. The computer can be touchscreen and/or non-touchscreen. The computer can include and/or be part of another computer system and/or cloud network. The computer can run any type of OS, such as iOS™, Windows™, Android™, Unix™Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 204, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can be equipped with NFC circuitry. The computer can run a database, such as a relational database, which contains payment information.

UserA 200 is in communication with network 204, such as direct, indirect, encrypted, unencrypted, and others. UserA 200 is in selective communication, such as direct, indirect, encrypted, unencrypted, and others, with at least one of the Oracle 201 and/or the Exchange 202 via network 204.

UserA 200 can be a consumer and/or a legal entity, such as an organization, a company, a partnership, and/or others. Oracle 201 is in communication with network 204, such as direct, indirect, encrypted, unencrypted, and others. Oracle 201 is in selective communication, such as direct, indirect, encrypted, unencrypted, and others, with at least one of UserA 200 and Exchange 202 via network 204. For example, Oracle 201 can communicate with the acquirer of Exchange 202 regarding Exchange 202. For example, Oracle 201 can communicate with UserA 200 via email or any other means of communication.

Oracle 201 may include a financial entity, such as a bank, an exchange, a secure server, and/or others, and/or any other organization that engages in the exchange and management of blockchain-assets.

The Oracle may be a financial entity, which accepts and/or processes blockchain-asset transactions for Exchange 202, including crediting or debiting an account of Exchange 202. Such accepting and/or processing is for a good and/or a service offered via Exchange 202 to UserA 200. The Oracle may also be a server or series of servers or an application or series of application running autonomously on computers or servers. Exchange 202 is in communication with network 204, such as direct, indirect, encrypted, unencrypted, and others. Exchange 202 is in selective communication, such as direct, indirect, encrypted, unencrypted, and others, with at least one of UserA 200 and Oracle 201 via network 204. Exchange 202 includes an individual, an organization, and/or a business accepting blockchain-asset transactions whether directly and/or indirectly. Exchange 202 includes a for-profit entity, a non-for-profit entity, a government agency, and/or others. Exchange 202 includes an online Exchange, a brick-and-mortar Exchange, and/or any combination thereof. Note that any amount of merchants or exchanges 202 can be used, as described herein. UserA 200 can be Exchange 202 and/or Exchange 202 can be UserA 200.

Figure 3:
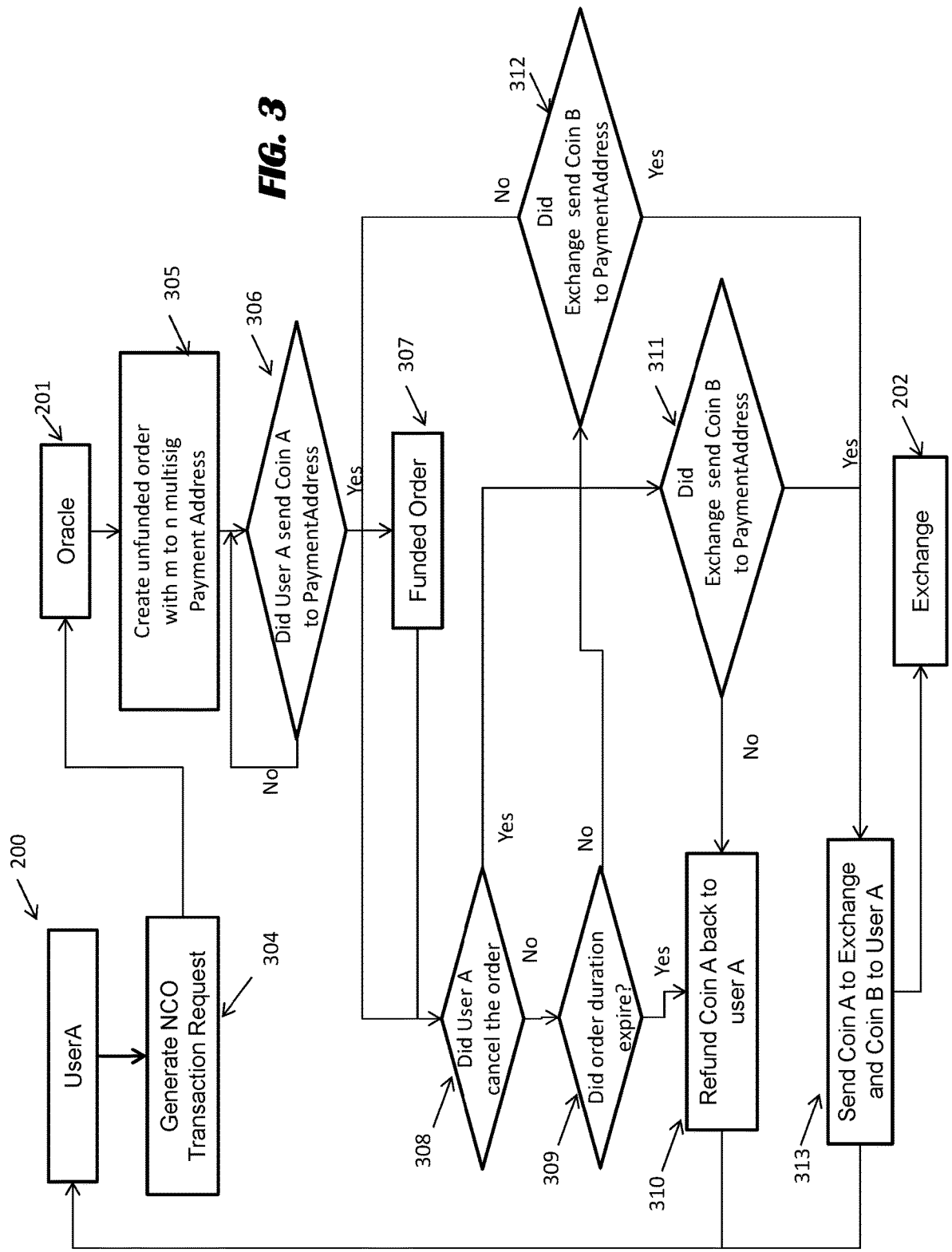
FIG. 3 depicts a flow chart illustrating the steps in an embodiment of the present disclosure.

FIG. 3 illustrates an embodiment in accordance with the present disclosure. UserA 200 creates a non-custodial order transaction request 304 with a Exchange 202 by specifying the type of CoinA that UserA has and wants to exchange and optionally the amount. UserA specifies the type of coin, CoinB that UserA wishes to acquire, the desired price of CoinB, a Final_Address, a Refund_Address, and how long the order should be in place, i.e., the duration, in hours or days. In an embodiment, the Expected Amount of CoinB is automatically established from the price.

In response, Oracle 201 creates an Unfunded Order 305 with these specified criteria and requests UserA to send CoinA to a 2-of-3 multi-sig Payment_Address. UserA, the Oracle and the Exchange all generate keys based on a public key function and no party can see the other party's keys. A User's key can either be shown explicitly to her, or held safely in her browser window (client-side).

Once the Unfunded Order is established, UserA sends CoinA to the designated Payment_Address. At step 306, the system waits for confirmation that UserA sent CoinA to the specified Payment_Address. Confirmation may be obtained by monitoring the block chain information to determine when funds have been transferred. Once payment is confirmed, the order transitions from an Unfunded Order to a Funded Order 307. If UserA 200 does not send payment within a specified period, the unfunded order may be closed by Oracle 201. At this point, CoinA is held in the 2-of 3 multi-signature account, with the three keys held by UserA, the Oracle and the Exchange, respectively.

At step 308, the system determines if UserA cancelled the order. If an order is cancelled by UserA 200, the Oracle 201 will sign a refund to UserA if the expected Amount of CoinB is not at the Final_Address at the time of cancellation. If the order is not canceled the system proceeds to step 309. At step 309, the system checks to see if the order duration has expired. If the order expires due to the duration expiring in step 309, then the Oracle 201 will send UserA's CoinA back to the Refund_Address at step 310. In this manner every order shall either be filled, cancelled or expire and the Oracle will not retain UserA's coin or Exchange's coin B. The system is safe for UserA 200 because the Exchange 202 can't take UserA's CoinA until after it has sent CoinB to her. In the present disclosure, the system provides safety for the Exchange once they send coin B because UserA cannot cancel the Order once the CoinB has been sent and UserA is not at risk because UserA's CoinA will be returned if the transaction is cancelled or expires.

In an embodiment, the check on the expected amount at step 312 by the Oracle 201 will be done some time after UserA's signature is received to prevent a "race" condition. In an embodiment, this was done roughly hour (though any time may be used) after UserA's signature was received from the associated client computer, although the duration can be anything short of the expiration time. If the expected amount of CoinB is not at the Final_Address, at step 312, the Oracle 201 will sign the transaction that sends CoinA back to UserA if the order has been cancelled at step 308 or expired at step 309, otherwise it will wait for the Exchange 202 to send coin B to the Payment_Address at step 311.

If Exchange 202 sends the expected amount of CoinB to the Final_Address, at step 313 the Oracle will sign the payment to the Exchange and the Oracle will send the CoinA to the Merchant_Address and send Coin B to UserA at its designated Final_Address completing the order.

Figure 4:
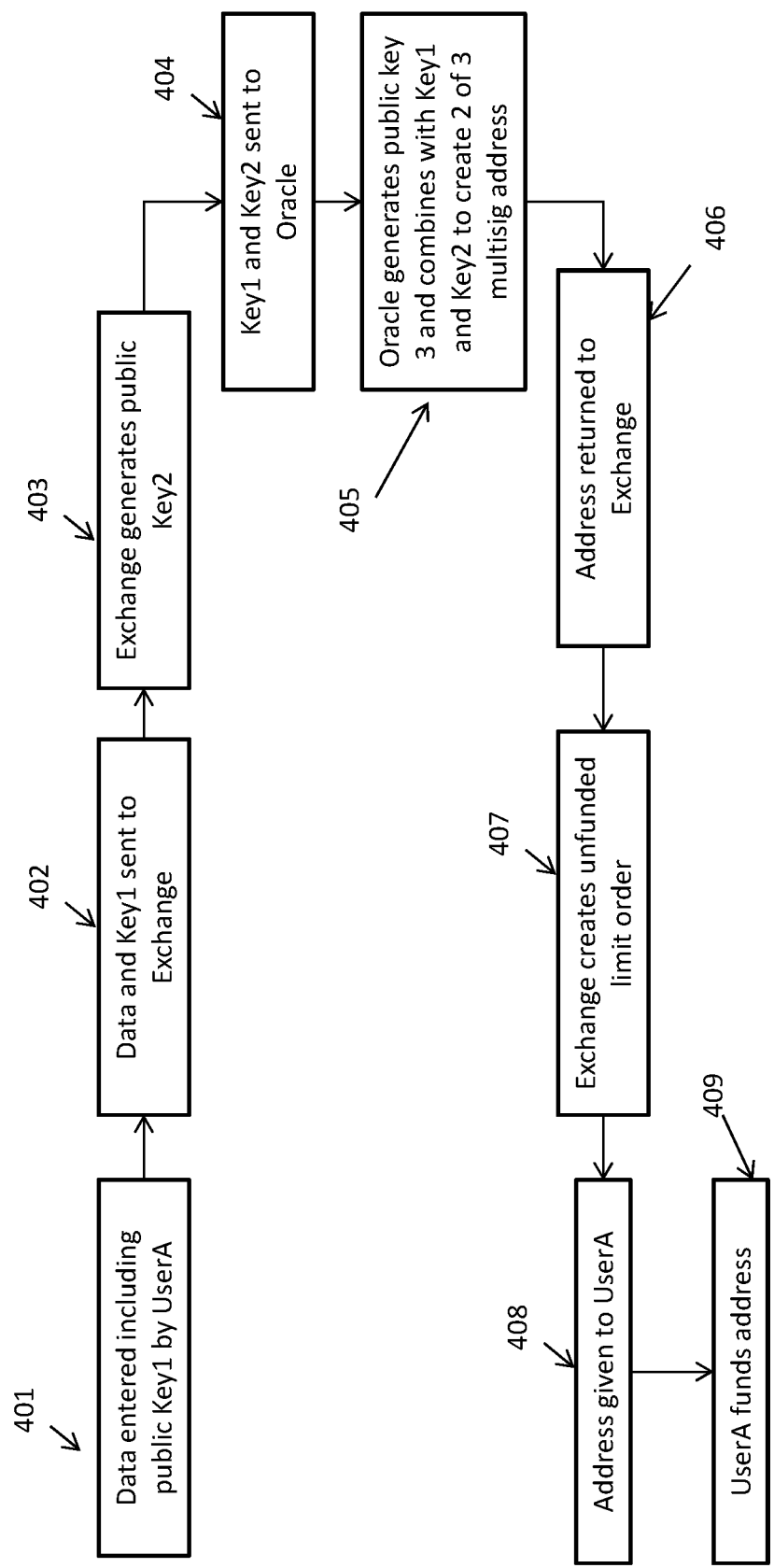
FIG. 4 depicts a flow chart illustrating the steps in an embodiment of the present disclosure.

FIG. 4 describes another embodiment of the systems and method described and the steps used to generate public keys, and order completion. At step 401, data is entered by UserA from a browser or other input portal indicating the desire to engage in a blockchain-asset exchange. In an embodiment, a User account is created to facilitate data entry. In another embodiment, no account is required, and the order data is simply transmitted between the User, the Exchange and the Oracle.

UserA may input order amount, currency to exchange, and the duration an order should remain in place. UserA also enters information to generate public Key1. UserA's browser using client side codes that no other users have access to creates public key1. This ensures that the public key is only accessible by UserA and no one else. Once key1 is generated it is saved. Data and Key1 critical for the transaction are passed to the Exchange at step 402. At step 403, the Exchange will use the key1 generated by UserA to generate public Key2 and any other data necessary for the transaction. The keys act as the signatures on the multisig account.

Once Key2 is generated, at step 404, both the User's public Key1 and the Exchange's public Key2 will be sent to the Oracle. At step 405, the Oracle will use all the received information to generate a public Key3 and combines it with Key1 and Key2 to create the Deposit_Address for the multisig account. At step 406, the Oracle will return that address to the Exchange. The Exchange at step 407 will use the data to create the unfunded limit order. At step 408, the Deposit_Address is sent to UserA. At step 409, UserA transfers the funds to the Deposit_Address.

Figure 5:
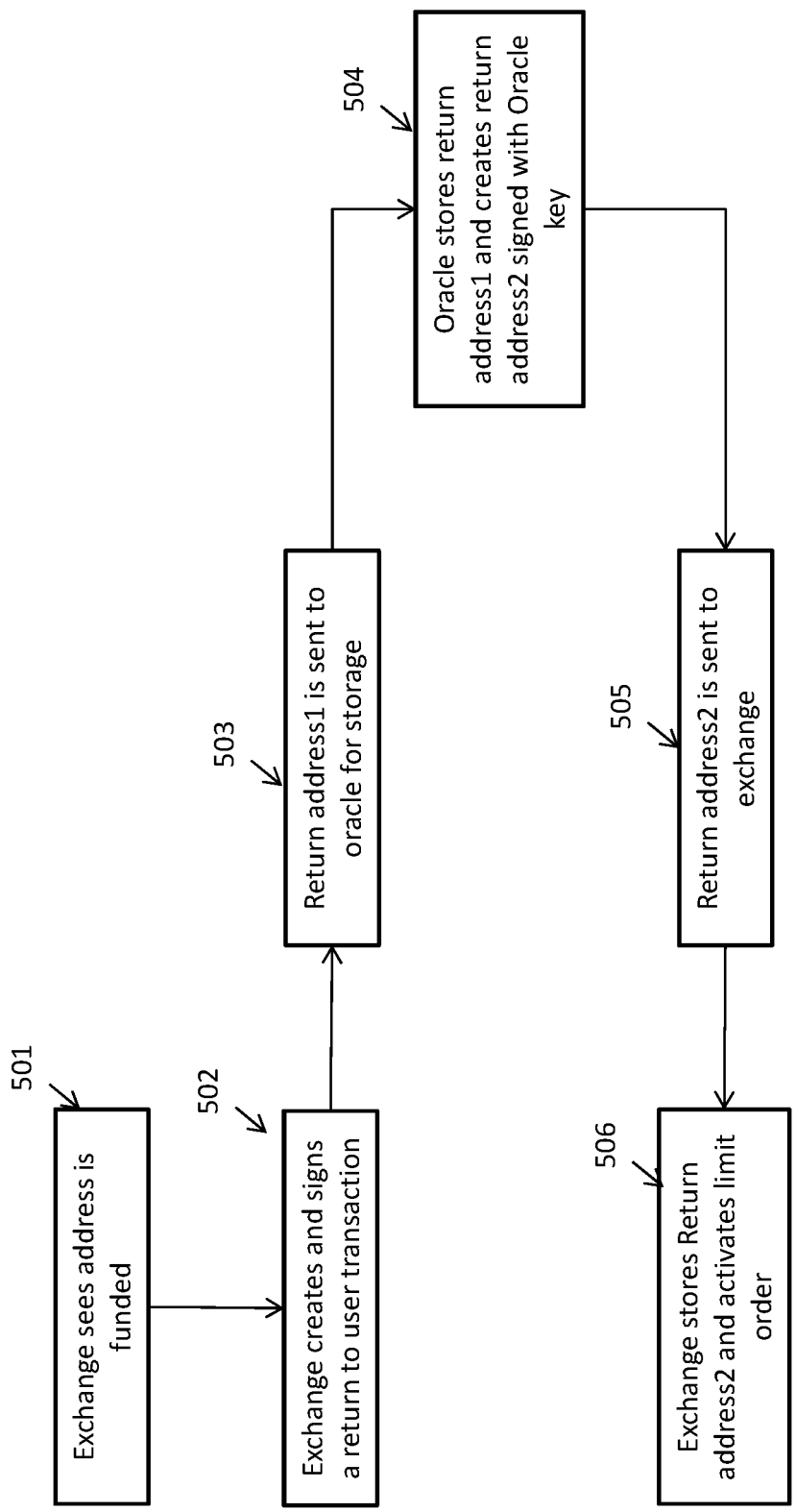
FIG. 5 depicts a flow chart illustrating the steps in an embodiment of the present disclosure.

FIG. 5 depicts the second steps in the system and method of the present disclosure. At step 501, the Exchange checks block chain data on the network to see if the Deposit Address created in step 405 has been funded. Once it confirms that UserA has funded the address at step 502, the Exchange will create and sign a return to User transaction. The return to User transaction and a return a document will be sent to the Oracle for storage at step 503. This is essentially a return address from the User. The return address is the only address that the funds can be sent back to the User. This is done for security purposes so that someone can not access the User's key later and change the address and have the currency sent to a different address. Essentially the Exchange will sign the transactions of that return and give it to the Oracle for storage. In this way, if the Oracle needs to refund the User, it already has a signed OK from the Exchange. Oracle at step 504, will also sign a transaction to that return and send it back to the Exchange at step 505 for storage. At step 506, the Exchange stores the return address and activates the order. This ensures that the Exchange can refund to the User if the Oracle disappears. At which point, the Exchange will look to fill the order. As illustrated in FIG. 5, the User's funds can be returned to the User in the event that the Oracle or the Exchange disappear and are not available at the necessary time to sign the multisig account.

Figure 6:
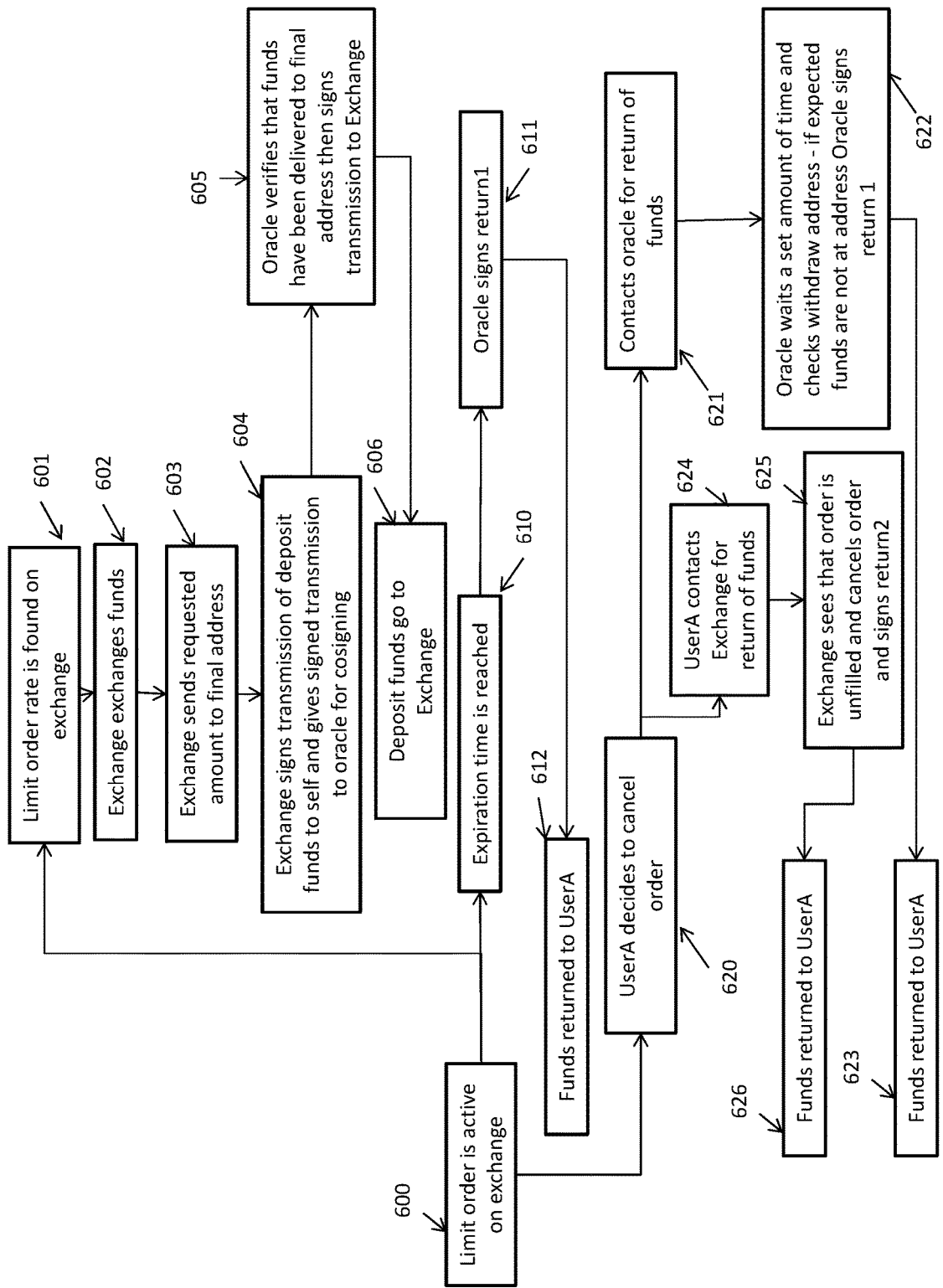
FIG. 6 depicts a flow chart illustrating the steps in an embodiment of the present disclosure.

FIG. 6 depicts the third step in an embodiment of the system and method of the present disclosure. In FIG. 6, at step 600, the limit order is active. From step 600, there are three possible scenarios. The order is filled, the order expires or the order is cancelled. If the order is to be filled, the Exchange system searches and determining when and if that order can actually be filled, i.e., there is an account, whether the Exchange itself or another user, willing to make the exchange with UserA.

At step 601, the Exchange finds the rate on the exchange that can fill UserA's order (in full or in part). At step 602, the Exchange makes the transaction and exchanges the funds. The Exchange at step 603 then sends the requested amount (in full or in part) to the Final_Address which is UserA's account. Once that is completed, at step 604, the Exchange will request the transaction of the deposit funds to its account, and sends that information the Oracle to co-sign. At step 605, Oracle will automatically confirm that the funds (in full or in part) have been delivered to UserA, by verifying the Final_Address on the blockchain. If it successfully verifies the exchange, then the Oracle will sign the transaction (for the full amount or respective portion thereof) and broadcast that transaction or send that information back to the Exchange. At that point, the Exchange will broadcast the transaction to itself and have the required two signatures to complete the transaction. At step 606 once the two signatures are received, the User's funds will be deposited into the exchange.

In another scenario the order expires before it is filled. This might occur, If before the limit order can be filled at step 601, the order expires at step 610. In an embodiment, when a User originally sets up their order and account in steps 401, one of the pieces of data they will enter is an expiration time, at which point if the order has not been filled it will automatically be returned to the User (partially so if the order was in part filled).

If the expiration time is reached at step 610, Oracle will note the expiration and at step 611 will sign the return which the exchange already signed in step 604 so that the funds can be sent back to the User's address at step 612. In an embodiment, the User can decide to cancel the order at step 620 anytime up until the expiration time is reached or the order has been filled.

Normally the Oracle will be contacted, at step 621, but in an embodiment the Exchange can also return the funds. At step 622, the Exchange or the Oracle will wait and then check to make sure that the withdraw address is not funded, basically making sure that the User is not trying to defraud the Exchange. Once that information is confirmed, the Oracle will sign a return_a so that the funds can be sent back to the User at step 623. If for some reason the Oracle has disappeared, at step 624, the User contacts the Exchange for a refund. At step 625, the Exchange can confirm that the order is unfilled by verifying the withdraw address. If that is confirmed, then the Exchange can sign the return_b and the funds are returned to the User at step 626. This is possible because the Oracle pre-signed for the return. In an embodiment, any cancellation first attempts to go through the Oracle first because it will be automatically processed. If for some reason the Oracle does not respond, the Exchange can also refund the currency so that the funds are not lost where no one can access them.

Figure 7:
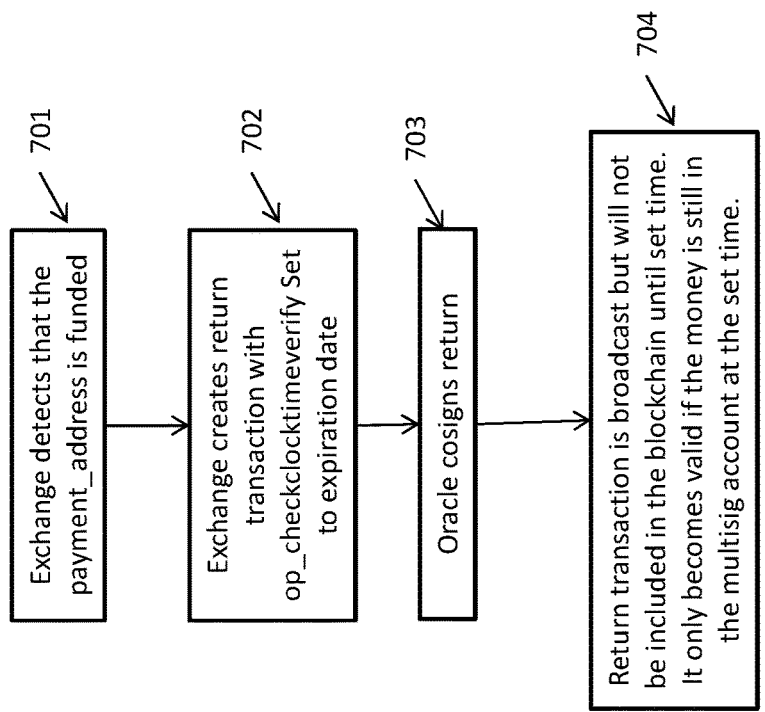
FIG. 7 depicts a flow chart illustrating the steps used in returning assets in an embodiment of the present disclosure.

FIG. 7 illustrates an embodiment for providing a User with a refund in the event that both the Oracle and the Exchange disappear. At step 701, the Exchange, by monitoring the blockchains, detects that the User has funded the Payment_address. Once the funding is detected, at step 702, the Exchange will create a return transaction to the User Return address that specifies an op_checklocktimeverify for the order expiration date and a buffer time (e.g., seven days). The Oracle at step 703 will co-sign this transaction and broadcast it at step 704. The User can see that the return transaction is in place on the blockchain, but it is not confirmed in the blockchain until the prescribed time is reached and if the order was not completed or cancelled in the interim.

This is similar to the Bitcoin feature, "CheckLockTime" that enables users to complete transactions and broadcast them, but the transactions do not become "valid" or "confirmed" until the specified time. In the present disclosure, the Exchange broadcasts the return transaction, then even if the Oracle and the Exchange go offline or disappear, the User will get the assets back as long as it has not been completed by the prescribed time. If the order is returned to the User, or completed successfully, then the op_checklocktimeverify transaction will be invalid because the funds will already have been be sent. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of ordering an exchange of blockchain digital assets via a zero-custody switch, the method comprising:
generating a limit order request for a non-custodial exchange of a first blockchain digital asset for a second blockchain digital asset, the first blockchain digital asset being held by a customer, and the second blockchain digital asset being held by a counterparty;
generating a cryptographic key pair including a customer spending key and a customer public key, the customer public key representing a payment address on a network of the first blockchain digital asset;
transmitting, to an oracle, a refund address on the network of the first blockchain digital asset, a final payment address on a network of the second blockchain digital asset, and the customer public key on the network of the first blockchain digital asset;
receiving a multisignature blockchain digital asset payment address valid on the network of the first blockchain created based on at least three public keys including the customer public key, an oracle public key, and a counterparty public key, the oracle public key and the counterparty public key being paired with an oracle spending key and counterparty spending key, respectively;

blockchain digital asset funds in the multisignature blockchain digital asset payment address being spendable only if at least two spending keys out of the customer spending key, the oracle spending key, and the counterparty spending key co-sign a spending transaction valid on the network of the first blockchain due to the multisignature blockchain digital asset payment address generation based on the customer public key, the oracle public key, and the counterparty public key, which are the cryptographic keys paired therewith;

broadcasting a deposit transaction to the network of the first blockchain digital asset, the deposit transaction transferring a purchase amount of the first blockchain digital asset to the multisignature blockchain digital asset payment address.

2. The method of claim 1, further comprising:

co-signing a refund transaction with the customer spending key, the refund transaction spending funds from the multisignature blockchain digital asset to the refund address on the network of the first blockchain digital asset if at least one other spending key corresponding to one of the at least three public keys also co-signs the refund transaction; and transmitting the refund transaction to the oracle for co-signing.

3. The method of claim 1, further comprising:

receiving, from the counterparty, upon confirmation of the deposit transaction, a refund transaction with a checklocktimeverify specified time, signed with the counterparty spending key, after which specified time has been reached, the refund transaction will become valid on the blockchain with only a signature by the customer spending key, and not the oracle spending key, to spend funds from the multisignature blockchain digital asset payment address to the refund address on the network of the first blockchain digital asset.

4. The method of claim 1, further comprising:

pre-signing a refund transaction with the customer spending key, the refund transaction spending funds from the multisignature blockchain to the refund address on the network of the first blockchain digital asset if at least one other spending key corresponding to one of the at least three public keys also signs the refund transaction; and transmitting the refund transaction to the counterparty with a request to refund the purchase amount of the first blockchain digital asset.

5. A method for securing the exchange of digital assets via a zero-custody switch:

receiving an order request for a non-custodial exchange of a first blockchain digital asset for a second blockchain digital asset, the first blockchain digital asset being held by a customer and the second blockchain digital asset being held by a counterparty, the request including a final payment address of the customer on a network of the second blockchain digital asset;

generating a cryptographic key pair including a counterparty public key and a counterparty spending key, the counterparty public key representing a payment address on a network of the first blockchain digital asset;

creating a multisignature blockchain digital asset payment address valid on the network of the first blockchain, the multisignature blockchain digital asset payment address based on at least three public keys valid on the network of the first blockchain digital asset including a customer public key, an oracle public key, and the counterparty public key;

blockchain digital asset funds in the multisignature blockchain digital asset payment address only being spendable if at least two of the counterparty spending key, a customer spending key, and an oracle spending key co-sign a spending transaction valid on the network of the first blockchain due to the multisignature blockchain digital asset payment address generation based on the customer public key, the oracle public key, and the counterparty public key, which are the cryptographic keys paired therewith;

determining whether the multisignature blockchain digital asset address satisfies a funding condition;

broadcasting one or more order-filling transactions if the multisignature blockchain digital asset address satisfies the funding condition, the order-filling transactions spending funds to the final payment address of the customer on a network of the second blockchain digital asset;

determining whether the final payment address on the network of the second blockchain has been funded when the final payment address appears on the second blockchain;

after the operation that determines the final payment address on the network of the second blockchain has been funded, co-signing a transmission of deposit funds to self with the counterparty spending key; and transmitting the single-signed transaction of deposit funds to self to the oracle for co-signing with the oracle spending key.

6. The method of claim 5, further comprising:

before the operation that determines the final payment address on the network of the second blockchain has been funded, forming a refund transaction with a checklocktimeverify specified time, after which specified time has been reached, the refund transaction will become valid on the blockchain with only a signature by the user spending key and not the counterparty spending key or an oracle spending key.

7. The method of claim 5, wherein the order request for a non-custodial exchange includes a desired amount of the first digital asset and a desired amount of the second digital asset.

8. The method of claim 5, wherein the order-filling transaction partially fills the order request, and further comprising:

outputting a partial refund transaction, the partial refund transaction defining a difference between a value of the exchange transaction and a request exchange amount included in the order request;

signing the partial refund transaction with the counterparty spending key; and transmitting the partial refund transaction to the oracle with a request to sign the partial refund transaction with the oracle spending key.

9. The method of claim 5, further comprising:

receiving a refund transaction from the oracle pre-signed with the oracle spending key, the refund transaction spending funds in the multisignature blockchain digital asset payment address to a refund address of the customer.

10. A non-transitory computer-readable medium encoded with instructions which, when executed by a processor, cause the processor to implement an oracle for a zero-custody switch, the instructions comprising:
  receiving, at the oracle, a limit order request for a non-custodial exchange of a first blockchain digital asset for a second blockchain digital asset, the first blockchain digital asset being held by a customer, the second blockchain digital asset being held by a counterparty, and the limit order request including a final payment address of the customer on a network of the second blockchain digital asset, a refund address of the customer on a network of the first blockchain digital asset, and a customer public key on the network of the first blockchain digital asset;
  generating, by the oracle, a key pair including an oracle spending key and an oracle public oracle key, the oracle public key representing a payment address on the network of the first blockchain digital asset;
  receiving, at the oracle, a multisignature blockchain digital asset payment address valid on the network of the first blockchain created based on at least three public keys including the customer public key, the oracle public key, and a counterparty public key for funding the limit order request, the counterparty public key and the customer public key being paired with a counterparty spending key and customer spending key, respectively;
  determining, by the oracle, whether the multisignature blockchain digital asset payment address satisfies a funding condition;
  determining, by the oracle, whether the final payment address of the customer satisfies a final payment condition; and
  signing, by the oracle, a completion transaction with the oracle spending key, the completion transaction being a release transaction spending funds in the multisignature blockchain digital asset payment address to the counterparty public key if the funding condition and the final payment condition are satisfied, and the completion transaction being a refund transaction spending funds in the multisignature blockchain digital asset payment address to the refund address of the customer if the final payment condition is not satisfied.

11. The non-transitory computer-readable medium of claim 10, wherein the instructions further comprise:
  the oracle waiting until the expiration of a race-condition period before the operation that signs the completion transaction with the oracle spending key.

12. The non-transitory computer-readable medium of claim 10, further comprising:
  determining, by the oracle, an expiration period of the limit order request has elapsed;
  determining, by the oracle, the final payment address of the customer does not satisfy the final payment condition; and
  signing, by the oracle, a refund transaction with a checklocktimeverify specified time, signed with the oracle spending key, after which specified time has been reached, the refund transaction will become valid on the blockchain with only a signature by the oracle spending key, and not the counterparty spending key, spending funds in the multisignature blockchain digital asset payment address to the refund address of the customer on the network of the first blockchain digital asset.

* * * * *